United States Patent [19]

Jackson

[11] Patent Number: 5,398,652
[45] Date of Patent: Mar. 21, 1995

[54] KNIFE-EDGE ROCKER BEARING INTERNAL COMBUSTION ENGINE

[76] Inventor: Francis W. Jackson, 110 Summit Ave., Hatboro, Pa. 19040

[21] Appl. No.: 972,383

[22] Filed: Nov. 5, 1992

Related U.S. Application Data

[63] Continuation-in-part of Ser. No. 848,018, Mar. 9, 1992, abandoned, which is a continuation-in-part of Ser. No. 685,431, Apr. 15, 1991, abandoned, which is a continuation-in-part of Ser. No. 649,983, Feb. 4, 1991, abandoned.

[51] Int. Cl.$^6$ .................... F02B 75/32; F02B 75/04
[52] U.S. Cl. .................... 123/197.4; 123/197.3; 123/78 E; 384/4
[58] Field of Search ............... 123/197.3, 197.4, 78 E, 123/48 R, 48 B, 90.15; 384/4, 154

[56] References Cited

U.S. PATENT DOCUMENTS

| | | | |
|---|---|---|---|
| 1,385,758 | 7/1921 | Schultz | 123/78 E |
| 1,445,882 | 2/1923 | Hem | 384/4 |
| 1,597,080 | 8/1926 | Lewis | 123/197.4 |
| 2,005,000 | 6/1935 | Miller | 123/78 E |
| 2,152,387 | 3/1939 | Porter | 384/4 |
| 2,217,721 | 10/1940 | Anthony | 123/78 E |
| 2,248,323 | 7/1941 | Anthony | 123/78 E |
| 2,252,153 | 8/1941 | Anthony | 123/78 E |
| 2,493,718 | 1/1950 | Chronic et al. | 123/197.4 |
| 2,909,163 | 10/1959 | Biermann | 123/48 B |
| 3,004,810 | 10/1961 | King | 123/78 E |
| 3,413,044 | 11/1968 | Weickhardt | 384/4 |
| 3,633,429 | 1/1972 | Olson | 123/197.3 |
| 3,693,463 | 9/1972 | Garman | 123/197.3 |
| 4,111,164 | 9/1978 | Wuerfel | 123/78 E |
| 4,124,002 | 11/1978 | Crise | 123/78 E |
| 4,437,438 | 3/1984 | Mederer | 123/48 B |
| 4,475,495 | 10/1984 | Lydell | 123/197.4 |
| 4,538,557 | 9/1985 | Kleiner et al. | 123/78 E |
| 4,957,069 | 9/1990 | Mederer | 123/78 E |
| 4,966,109 | 10/1990 | Pusic et al. | 123/197.4 |
| 4,979,428 | 12/1990 | Nelson | 123/197.4 |
| 5,199,403 | 4/1993 | Akazaki et al. | 123/90.15 |
| 5,216,987 | 6/1993 | Clarke | 123/90.15 |

FOREIGN PATENT DOCUMENTS

| | | | |
|---|---|---|---|
| 697126 | 1/1931 | France | 384/4 |
| 536732 | 5/1941 | United Kingdom | 384/4 |

*Primary Examiner*—Raymond A. Nelli
*Assistant Examiner*—Thomas N. Moulis

[57] ABSTRACT

Use of a low friction "Knife-edge" pivot bearing for a rocker arm drive for an Internal Combustion Engine; Controlling chamber pressure or TDC volume through 1) adjusting TDC volume as a function of engine operational conditions or 2) an energy store and return device including selection of TDC volume as a function of variable inlet valve timing and 3) increased nominal operating point piston speed.

4 Claims, 2 Drawing Sheets

KNIFE-EDGE ROCKER BEARING INTERNAL COMBUSTION ENGINE

This is a Continuation-in-Part Application to application Ser. No. 07/848,018, filed Mar. 9, 1992, which is a Continuation-in-Part of application Ser. No. 07/685,431, filed Apr. 15, 1991, which is a Continuation-in-Part Application to application Ser. No. 07/649,983, filed Feb. 4, 1991, all of which are now abandoned.

BACKGROUND OF INVENTION

Rocker arm IC engine drives have been tested with conventional crank pins as the pivot bearing. This oscillating arm pivot bearing has a substantial friction force that rubs, for a given oscillation angle, proportional to the pivot bearing pin radius. At nominally about 1 inch diameter the friction drag is substantial and negates much of the advantages of the addition of the rocker. Use of an expensive limited life roller bearing at the pivot could reduce the friction but paying the cost and life penalty. This design reduces the rubbing movement significantly reducing the friction while avoiding the high cost and finite life of roller bearings.

SUMMARY OF THE INVENTION

The invention is to employ a mechanical advantaged arm in an engine, compressor or expander drive to reduce the journal and piston friction and by use of a low friction economical rocker arm pivot (the subject if this application) avoid adding back significant friction or incurring the expense and finite life of roller bearing pivots.

DESCRIPTION OF THE PREFERRED EMBODIMENT(S)

Figure 1:
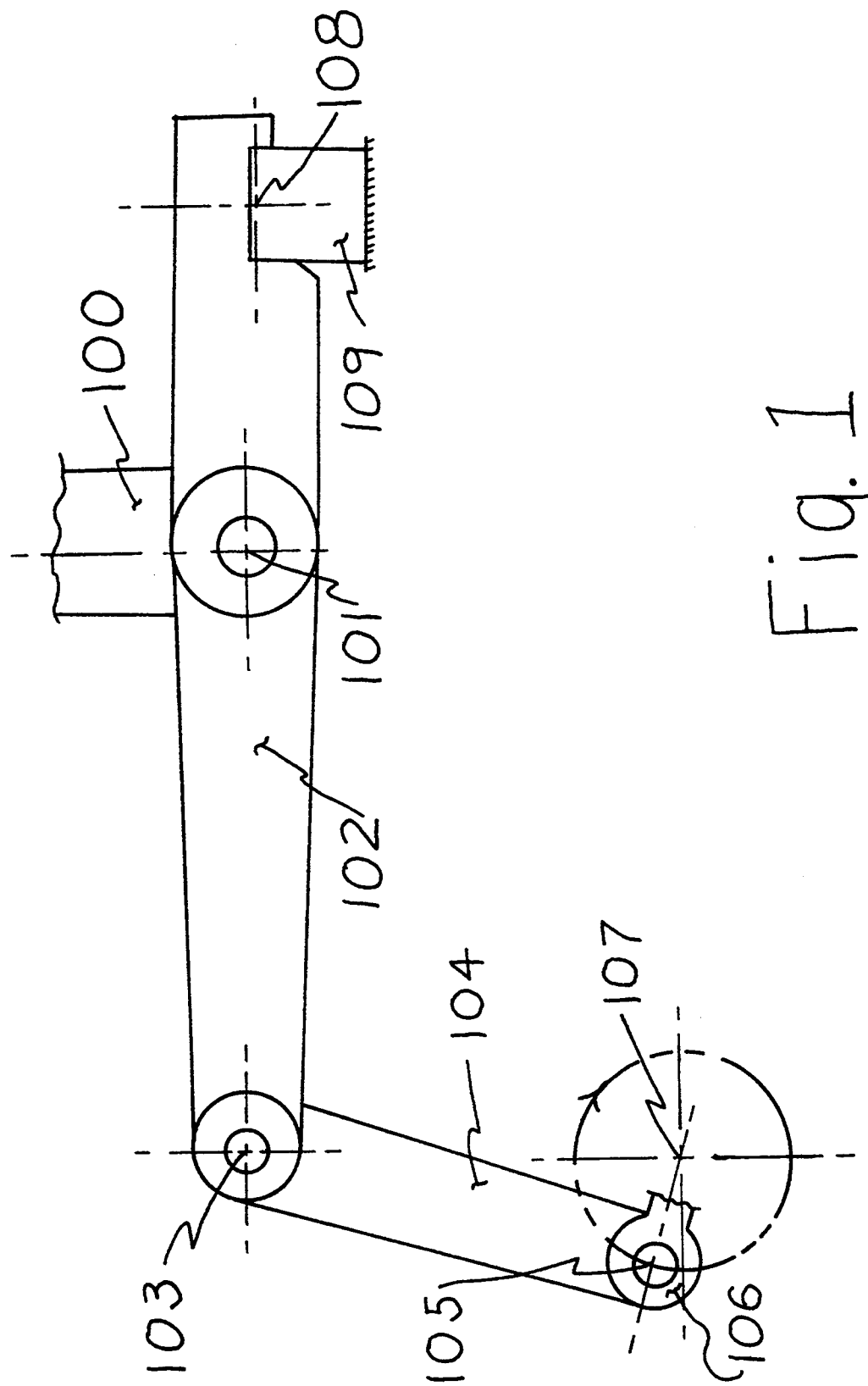
FIG. 1 shows the mechanical advantaged rocker arm with the subject of this application at pivot bearing 108.

FIG. 1 shows an IC engine alternative reciprocating drive. Conventional crank 106 rotating about axis at 107 and through crank arm bearing drives arm rod 105. Arm rod 105 through bearing centerline at 103 drives rocker arm 102. Rocker arm 102 is constrained to rotate about centerline at 108. Rocker arm 102 bearing at centerline 101 is driving a piston rod 100 which drives a piston (not shown) through conventional rod 100. Rocker arm 102 bearing 108 is supported by cantilever arm 109 constrained to rotation about a bearing at 110 and further constrained to rotation by upper limit stop 112, which is shown as fixed but could also be variable to set TDC minimum volume. Arm 109 is further constrained by a force over-ride piston at 111.

Figure 4:
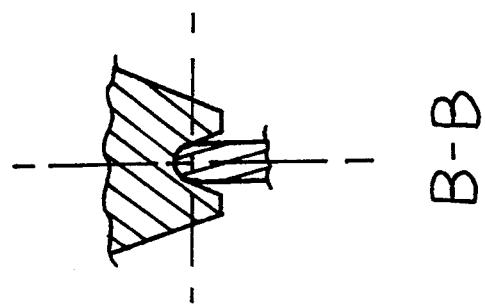
FIGS. 2–4 show the design of the low friction limited rotation capability rocker bearing.
Figure 2:
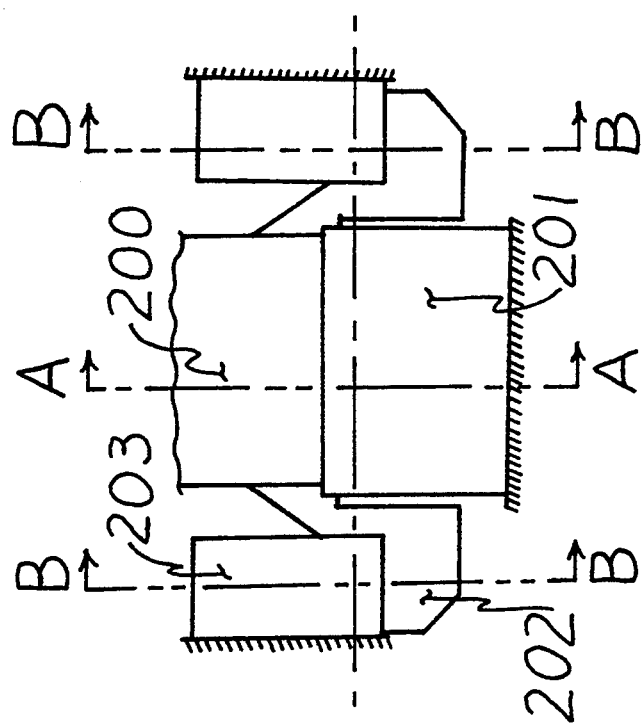
Figure 3:
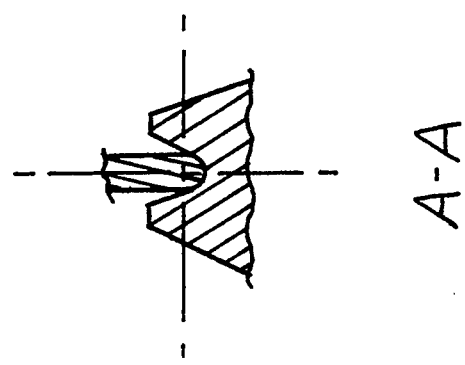

FIGS. 2–4 show an efficient knife edge bearing design for bearing at 108. This bearing design is also a candidate for bearing 101 and the bearing between the rod and piston. Piston arm rod pivot bearing is 200 a small radius edge fitting in a mating radius in block 201 preventing downward movement of the rod and also provides side load capability. Rod extensions 202 with small radius edges in blocks 203 prevent upward movement of rod 200 pivot and also side load capability. The radiuses do not have to be the same radius but do have to have their radiuses centers on the same centerline. Some resilience may be provided, e.g., on blocks, to ease tolerances.

I stated the radii need not be the same, because if the reverse load is smaller, a smaller radius will do the job and a smaller radius means reduced travel in the block hence reduced friction.

Assuming a 4667 lb max load and use of roller bearing high bearing stress materials (200–300 kpsi) at 100 kpsi design 1 inch long yields (4667/100,000) 0.0467 inch wide effective bearing surface or 0.0467/0.707=0.066 inch diameter. Therefore a 0.033 radius edge should be adequate. At 548 ave load, 0.06(a) coef of f (lubricated)×4 strokes×0.7 radians or 0.092 inch rubbing; 0.0924 inch×0.06 coef of f×548 lbs/12 in per ft yields 0.25 ftlbs; in the order of the roller bearing design (548 lbs×0.003 coef of f×2×Pi×2 in dia divided by 12 in per ft−0.55 ft lbs) or approximately 1% of the 85% reduction in the other areas (main bearings, crank bearings, etc.)—a viable reduced cost design versus a roller bearing.

Additionally, variations I am exploring for "knife" edge rocker designs (cut away to vary the mating contact surface as a function of rotational position (load) and/or having a spring override such that at light load only a portion of the contact surface is in contact and as high load is applied the override is overcome and the increased load capacity is on-line, of course the lighter load radius is smaller than the high load radius; having the potential of reducing the 1%; added design complexity of alternate probably not justified give the 1% performance is realized, but the alternate is available if the 1% is not achieved. Softer (less expensive) materials may be used, i.e., use of a 25,000 psi allowable would require 4 times the radius hence 4 times the movement and 4 times the friction or 4% vs the 1% for 100,000 psi allowable material.

(a) Ref Mark's Handbook, 8th edition, p 3–26 sliding lubricated hard steel on hard steel coef of friction varies from 0.029 up; I have selected 0.06 as the basis of my calculations. Diamond surfacing should also be investigated and should be less if it can stand up to the environment (pressure).

A single "knife" edge is a unidirectional resistance design and will require additions to provide bidirectional loading, albeit, the reverse loading (for single sided arm) should be considerably less. This reverse direction capability can be incorporated by a spring pre-load with or without a rolling contact. With rolling contact, the roller could be on a cam that against a spring load could vary the pre-load as a function of position and further could have the spring load varied as a function of engine conditions (ref engine reverse peak loading at 1208 fpm is 1/10th the peak, but at max rpm it has increased as the square of the FPM suggesting at nominal FPM, reverse load preload forces, hence its friction can be held small by limiting the preload; this should insure its effect is minor or a 1/10th of the approximately 1% calculated above or 1.1%) e.g., rpm in order to hold any added friction associated with including a bidirectional resistance capability to a negligible amount.

More than 2 edge "knife edge" designs are applicable to allow more uniform allowable loading as orientation of arm and load change, or more specifically; one "knife edge" provides max loading directly toward the "knife edge" and lesser capability as the orientation of the load changes and of coarse has no load carrying capacity away from the single "knife edge". Two, 180 degrees apart, provide peak loads in two directions and lesser capacities in other directions. Use of 3 120 degrees apart or 4 90 degrees apart, etc. are obvious at obtaining a more uniform capability. Direction can be emphasized by multiples bunched to tailor the capabilities to the expected load orientation profile.

The arm described in the above example appears quite practical using a 3 inch I-beam construction arm and steel capable of 20 to 30,000 psi tensile working stress. A good grade of steel should be adequate, as should a good grade of aluminum alloy and high specific strength materials, e.g., titanium.

I claim:

1. A reciprocating piston drive mechanism for Internal Combustion engines and compressors/expanders where the piston rod driving the piston is driven from an arm oscillating through less than 120 degrees peak to peak in rotation; and wherein a pivot bearing surface constraining said oscillating arm to rotation consists of a convex radius length of material held in a mating radius concave length of material; and wherein in a plane at right angles to the loci of said radii forming said bearing's surface are less than 360 degrees circumferentially; and wherein the load transmitted through said bearing for said convex length is supported by support material in a direction away from said mating surface; and wherein the load transmitted through said bearing for said concave length is supported by support material in a direction away from said mating surface.

2. As stated in claim 1; and wherein multiple said radius bearing mating surfaces are used and wherein the loci of the centers of curvature of the said rocker bearing mating surfaces form essentially a straight line and wherein said multiple bearing surfaces are displaced axially from one another along said line formed by the said loci.

3. A stated in claim 1; and wherein said radius is less than 0.05 inches per 1,000 pounds of maximum load.

4. As stated in claim 2; and wherein said radius is less than 0.05 inches per 1,000 pounds of maximum load.

* * * * *